United States Patent [19]

Arai et al.

[11] Patent Number: 5,353,735
[45] Date of Patent: Oct. 11, 1994

[54] INDICATING INSTRUMENT SYSTEM

[75] Inventors: Yoichi Arai; Yasuhiro Miyazawa; Makoto Takashima; Kunimitsu Aoki, all of Shizuoka, Japan

[73] Assignee: Yazaki Corporation, Tokyo, Japan

[21] Appl. No.: 872,198

[22] Filed: Apr. 22, 1992

[30] Foreign Application Priority Data

Apr. 23, 1991 [JP] Japan ............................ 3-028011[U]
Jul. 19, 1991 [JP] Japan ................................ 3-179376

[51] Int. Cl.$^5$ ............................................. G01D 11/28
[52] U.S. Cl. .............................. 116/286; 116/DIG. 5; 362/23; 362/26
[58] Field of Search .................... 116/286, DIG. 6; 359/869; 362/30, 23

[56] References Cited

U.S. PATENT DOCUMENTS

| | | | |
|---|---|---|---|
| 2,308,704 | 1/1943 | MacNeil | 362/30 X |
| 2,664,848 | 1/1954 | Nauth | 362/23 X |
| 4,215,647 | 8/1980 | Fukasawa | 116/286 |
| 4,218,726 | 8/1980 | Fukasawa et al. | 362/23 |
| 4,761,715 | 8/1988 | Brooks | 362/23 |
| 4,874,228 | 10/1989 | Aho et al. | 372/26 X |
| 5,129,269 | 7/1992 | Iizuka et al. | 362/30 X |
| 5,153,780 | 10/1992 | Jorgensen et al. | 359/869 X |

FOREIGN PATENT DOCUMENTS 193012 10/1963 Japan.
181815 11/1963 Japan.

Primary Examiner—Daniel M. Yasich
Attorney, Agent, or Firm—Nikaido, Marmelstein, Murray & Oram

[57] ABSTRACT

This invention relates to an indicating instrument for a vehicle or the like in which a pointer-indicated driving condition such as vehicle speed and rotation speed of an engine is formed by light, and to an indicating instrument system having the above indicating instruments. The structure of the indicating instrument is that a front surface having graduations is spherical such that the front surface sticks out forwardly as it is far from the rotation shaft and a light source is disposed in front of the dial and out of the graduations. Further, the indicating instrument system of the present invention indicates a cylindrical lens for converting beam from a point light source to a substantially linear beam; first and second reflecting plates for dividing the substantially linear beam into divided beam; and third and fourth reflecting plates for reflecting the divided beams each to a dial as a pointer indicating the graduations on the dial to a plurality of pointer forming portions.

6 Claims, 8 Drawing Sheets

INDICATING INSTRUMENT SYSTEM

BACKGROUND OF THE INVENTION

1. Field of the Invention

This invention relates to an indicating instrument, and more particularly to an indicating instrument for a vehicle or the like in which a pointer indicating driving condition such as vehicle speed and rotation speed of an engine is formed by light, and an indicating instrument system having the above indicating instruments.

2. Description of the Prior Art

FIG. 14 is a schematic drawing showing a cross-sectional view of the structure of a conventional indicating instrument, which is disclosed in Japanese Patent Publication No. Showa 63-193012.

In the figure, denoted 1 is an instrument case, 2 a dial having a shape of a flat plate attached to the case 1. On the front surface of the dial 2 is disposed graduations including characters corresponding to the graduations and a hole 2a through which a shaft portion 3a of a rotating body 3 described below is inserted.

Reference numeral 3 shows the rotating body, which comprises the shaft portion 3a inserted into the hole 2a of the dial 2 and top portion 3b engaged with the dial 2. The shaft portion 3a is provided with a center hole 3a1 along an axis thereof and a helical gear portion 3a2 on the periphery of the shaft portion 3a.

Further, the top portion 3b is provided with an opening 3b1 on a periphery thereof.

Denoted 4 is a mechanism mounted on the case 1. The mechanism 4 has a structure of a known analog meter, but, the dimensions thereof are miniaturized.

Reference numeral 4a is a rotation shaft of the mechanism 4, and 5 is a helical gear fixed to the rotation shaft 4a of the mechanism 4. The helical gear 5 engages the helical gear portion 3a2 of the rotating body 3.

Numeral 6 is a point light source emitting a beam B with a round cross section.

Designated 7 is a first reflecting plate disposed on the case 1, which reflects the beam B from the point light source 6 to the center hole 3a1 of the rotating body 3.

Numeral 8 shows a second reflecting plate disposed in the top portion 3b of the rotating body, which reflects the beam B from the center hole 3a1.

Denoted 9 is a cylindrical lens provided in the top portion 3b of the rotating body 3, which converts the shape of the beam into a shape of a line to introduce the beam B on the front face of the dial 2 through the opening 3b1.

Reference symbol P is an optical pointer formed on the front face of the dial 2.

FIG. 15 shows the principle of the conversion from the beam having a round cross section to the linear beam.

FIG. 16 is a drawing for explaining the condition for how the beam is reflected.

In the figure, designated E is the view point from which the indicating instrument is observed.

Next, the operation of the indicating instrument will be explained.

At first, the point light source 6 emits the beam B having a round cross section and the beam B from the point light source 6 is reflected by the first reflecting plate 7 toward the center hole 3a1 of the rotating body 3 and is further reflected by the second reflecting plate 8 toward the cylindrical lens 9.

Then, as shown in FIG. 15, the cylindrical lens 9 converts the round cross section of the beam from the second reflecting plate 8 to a substantially linear or elliptical shape so as to emit the beam B as the optical pointer P.

As described above, light forming the optical pointer P is reflected on the front surface of the dial 2 as shown in FIG. 16, so that the optical pointer P is recognized from the view point E as a pointer.

In the above condition, the rotating body 3 is rotated by the mechanism 4, which provides information on the driving condition through the graduations of the dial 2 corresponding to portions indicated by the optical pointer P. As a result, a driver can recognize the driving condition through reading the graduations on the dial 2 which is pointed by the optical pointer P.

FIG. 17 is a schematic drawing showing a cross-sectional view of the structure of another conventional indicating instrument, which is disclosed in Japanese Patent Publication No. Showa 63-193012. In the figure, like reference characters designate like corresponding parts of FIG. 14 and the explanation thereof will be omitted.

In FIG. 17, 7A is a first reflecting plate, 8A a second reflecting plate attached to a rotation shaft 4a of a mechanism 4.

Numeral 10 shows a housing having a hole 10a through which a beam B from a point light source not shown passes and reaches the first reflection plate 8A.

Denoted 11 is a cap and on a surface thereof opposite to the dial 2 is mounted the first reflecting plate 7A. The cap 11 functions as a cover of the first and second reflecting plates 7A and 8A so as not to be recognized from outside.

The operation of the indicating instrument described above is the same as that of the first conventional instrument. Therefore, the explanation thereof will be omitted.

Meanwhile, in the above publication, another embodiment is disclosed in which the beam from the point light source is introduced into the first reflecting plate or the second reflecting plate through a optical fiber not shown.

With the conventional indicating instrument with the structure described above, the beam B falls on the dial 2 is mostly reflected as shown in FIG. 16. That is, the beam B is mostly reflected in front of the dial 2 in the direction other than the view point E from which the dial 2 is observed.

Therefore, the optical pointer P indicating the graduations of the dial 2 is not recognized clearly, which reduces recognizability of the optical pointer P. In order to improve the recognizability of the optical pointer P, the intensity of the beam B should be increased. However, this causes power consumption to be increased.

With the conventional indicating instrument with the structure described above, one point light source 6 is required for one indicating instrument. Therefore, when a plurality of indicating instruments are used for displaying several types of information on the driving condition such as the vehicle speed, the rotation speed of an engine, the remaining fuel quantity, and the temperature of cooling water for the engine, the measuring system becomes expensive because a point light source 6 with an expensive semiconductor laser or the like is required for each indicating instrument.

SUMMARY OF THE INVENTION

It is therefore the object of the present invention to eliminate the above drawbacks of the conventional device and to provide an indicating instrument with a pointer formed by light indicating graduations of a dial in which recognizability of the pointer is improved in spite of low power consumption. In addition to the above, the length of the pointer is able to be changed.

It is a further object of the present invention to provide an indicating instrument system having a plurality of pointers formed by light with a low cost and low power consumption and which improves the recognizability of the optical pointer under the condition that the dial is directly observed.

An indicating instrument according to the present invention has a front surface of a dial (which incorporates a full range of graduations and a shaft) that is concavedly formed such that the outer curvature of the front surface of the dial sticks out forwardly relative to the shaft with a light source that is positioned in front of the dial and beyond the graduations and the like.

Further, another indicating instrument according to the present invention has a front surface of a dial comprising at least both ends of graduations and a shaft is formed as saw teeth defining concentric circles, and has an inclined face which sticks out forwardly as it is far from the shaft. A light source is positioned in front of the dial and out of the graduations and the like.

Further, in the indicating instrument according to another embodiment of the present invention, in addition to the above, a dial is made of a holographic optical element plate which reflects a diffracting beam in the direction substantially vertical to the dial.

Further, another indicating instrument according to the present invention has a pointer forming portion pivotally mounted to a shaft rotated by a mechanism so as to move in the direction vertical to a dial between a first reflecting position, where light fed to the pointer forming portion is reflected to a portion of the dial adjacent to the pointer forming portion, and second reflecting position, where the light is reflected to a portion from the portion of the dial adjacent to the pointer to a portion adjacent to the graduations and the like. A first urging member is provided for urging the pointer forming portion from the first reflecting position to the second reflecting position, and a second urging member is provided for urging the pointer forming portion to the first reflecting position, and when power is applied the pointer forming portion is urged from the first reflecting position to the second reflecting position by urging force of the first urging member, and a light source is positioned in front of the dial and out of the graduations and the like. Further, a front surface of the dial is formed as a spherical face or saw teeth as described above.

Further, in order to accomplish the above objective, an indicating instrument system comprising: a beam shape converting means for converting a beam from one light source is converted into a linear beam; beam dividing means for dividing the linear beam from the beam shape converting means into a plurality of divided beams; and a plurality of reflecting members for reflecting the plurality of divided beams which are divided by the beam dividing means to a plurality of pointer forming portions for further reflecting the plurality of divided beams each toward a dial as a pointer indicating graduations on the dial.

Since the dial of the indicating instrument according to the present invention is formed as a sphere or saw teeth describing concentric circles, light from the pointer forming portion is to be reflected on the front surface of the dial toward the view point.

Further, in another embodiment of the present invention, since the dial is made of a holographic optical element plate, the dial emits diffracting beams according to the divided beams in the direction substantially vertical to the dial.

Further, another indicating instrument according to the present invention has a structure in which the length of the pointer formed by light can be changed by the urging force of the first and second urging members.

Further, a beam from one light source of the indicating instrument system according to the present invention is converted into a linear beam by a beam shape converting means and is divided into a plurality of divided beams by a beam dividing means. Then, the beams are reflected on dials after being reflected to a plurality of reflecting members to a plurality of pointer forming portions.

BRIEF DESCRIPTION OF THE DRAWINGS

The present invention will be more apparent from the ensuing description with reference to the accompanying drawings wherein.

DETAILED DESCRIPTION OF PREFERRED EMBODIMENTS

Now, embodiments of the present invention will be explained with reference to the drawings.

Figure 1:
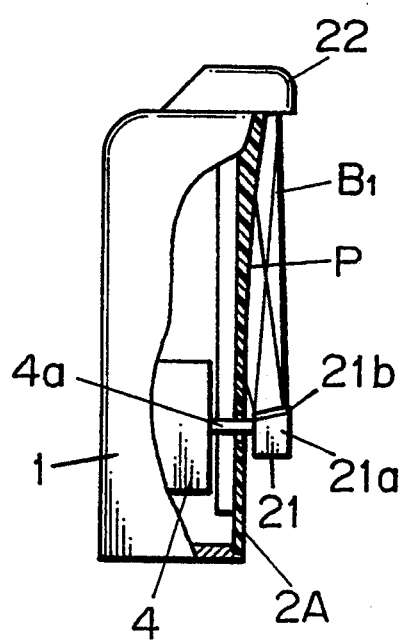
FIG. 1 is a schematic drawing showing a cross-sectional view of an indicating instrument according to one embodiment of the present invention.
Figure 2:
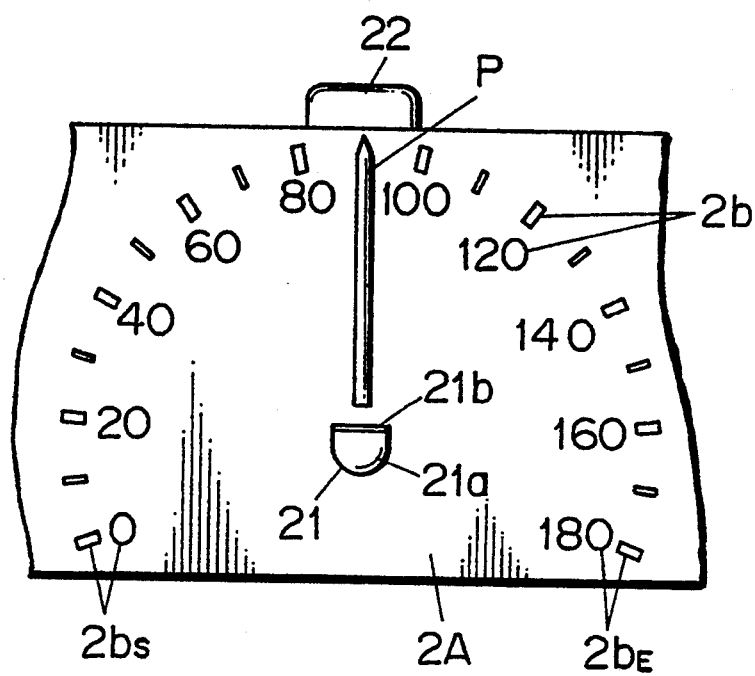
FIG. 2 is a plan view of the dial and the light source of the indicating instrument shown in FIG. 1.

FIG. 1 is a schematic drawing showing a cross section of an indicating instrument according to an embodiment of the present invention and FIG. 2 is a plan view of a dial and a light source of the indicating instrument of FIG. 1. Like reference characters designate like corresponding parts of FIGS. 14 to 17 and the explanation thereof will be omitted.

In the figures, denoted 2A is the dial such as a meter panel, which comprises at least two ends 2bs and 2be (2bs and 2be correspond to the start and end of the graduations respectively) of the graduations or the like (hereinafter referred as "graduations") and a rotation shaft 4a corresponding to a shaft driven by a mechanism 4 to which pointer forming portion 21 described below is attached. Further, the front surface of the dial 2A is concavedly formed in such a manner that the outer curvature of the face of the dial extends out forwardly relative to the rotation shaft 4a that extends through the dial 2A.

Reference numeral 21 shows the pointer forming portion, which comprises a base 21a attached to an end of the rotation shaft 4a of the mechanism 4 and a reflection plate 21b diagonally mounted to the base 21a to reflect a beam B1 from the light source described below toward the front surface of the dial 2A.

Denoted 22 is the light source which is disposed in front of the dial 2A and out of the graduation 2b.

Figure 3:
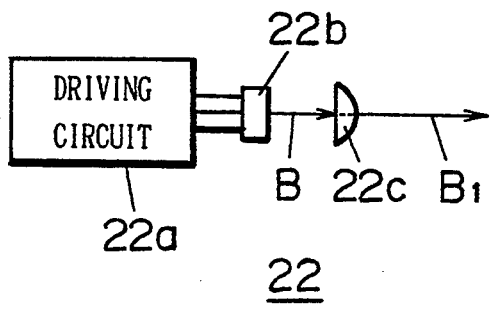
FIG. 3 is a schematic drawing showing a configuration of the light source.

FIG. 3 is a schematic drawing showing a configuration of the light source.

In the figure, numeral 22a is a driving circuit and 22b a laser such as a semiconductor laser for outputting a beam (laser beam) B with a round cross section by the control of the driving circuit 22a. Further, 22c is a cylindrical lens for converting the beam B introduced from the laser 22b into the beam B1 having a certain width in the direction vertical to the dial 2A described above.

Next, the operation of the indicating instrument will be explained.

At first, when the laser 22b emits the beam B by the control of the driving circuit 22a, since the beam B is converted into the beam B1 by the cylindrical lens 22c, the beam B1 from the light source 22 falls on the reflection plate 21b of the pointer forming portion 21.

Then, the beam B1 falling on the reflecting plate 21b is reflected to the front surface of the dial 2A as shown in FIG. 1 since the reflecting plate 21b is inclined.

As described above, when the beam B1 is reflected to the front surface of the dial 2A, the beam B1 forms the optical pointer P as illustrated in FIG. 2.

In this case, the pointer forming portion 21 is rotated by the mechanism 4, so that the graduation 2b corresponding a portion which is pointed by the optical pointer provides information on the driving condition.

Therefore, the graduation 2b on the dial 2A which is pointed by the optical pointer is read to obtain information on the driving condition.

As described above, in this embodiment, the front surface of the dial 2A is formed as to concave face. Therefore, properly selected curvature of the face effectively reflects the beam B1 forming the optical pointer, resulting in improved recognizability of the optical pointer P.

As a result, the recognizability of the optical pointer P can be improved in spite of low power consumption.

Meanwhile, in this embodiment, the overall front surface of the dial 2A may be formed as a curved face having a center thereof in front of the dial 2A and on an extended line of the rotation shaft 4a.

Further, the light source 22 is preferably located at a position corresponding to the central portion of the graduations 2b since the pointer forming portion 21 rotates as shown in FIG. 2. This is also applied to the embodiments described below.

Figure 4A:
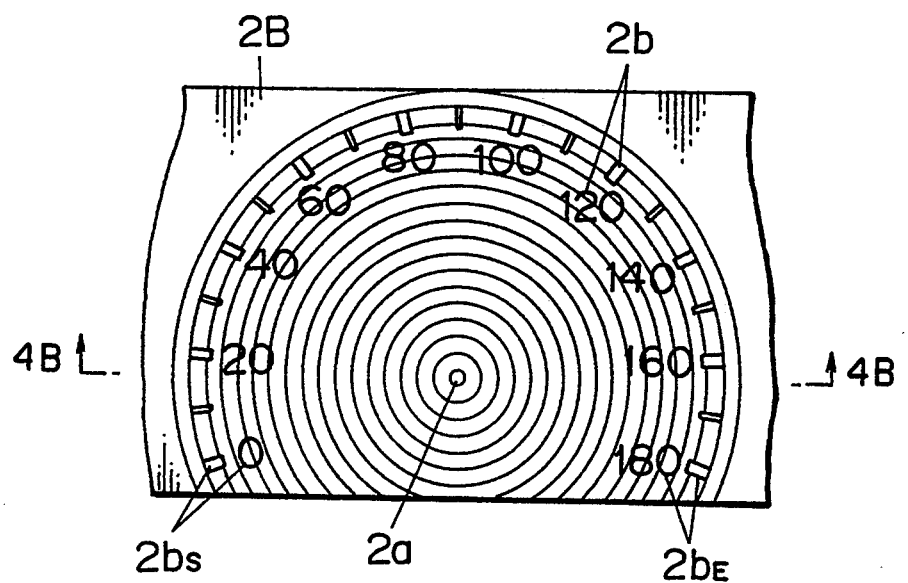
FIGS. 4A and 4B are drawings showing a dial of an indicating instrument according to another embodiment of the present invention in which 4A shows a plan view and 4B is a cross-sectional view taken along the line B—B of FIG. 1.
Figure 4B:
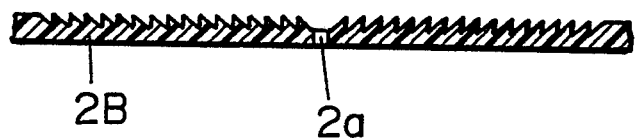

FIGS. 4A and 4B show a dial used for an indicating instrument according to another embodiment of the present invention. FIG. 4A is a plan view of the indicating instrument and FIG. 4B shows a cross-sectional view of the indicating instrument taken along the line B—B of FIG. 4A.

In the figures, reference numeral 2B is a dial and the front surface thereof is formed as saw teeth defining concentric circles and having inclined faces which stick out forwardly.

Figure 5:
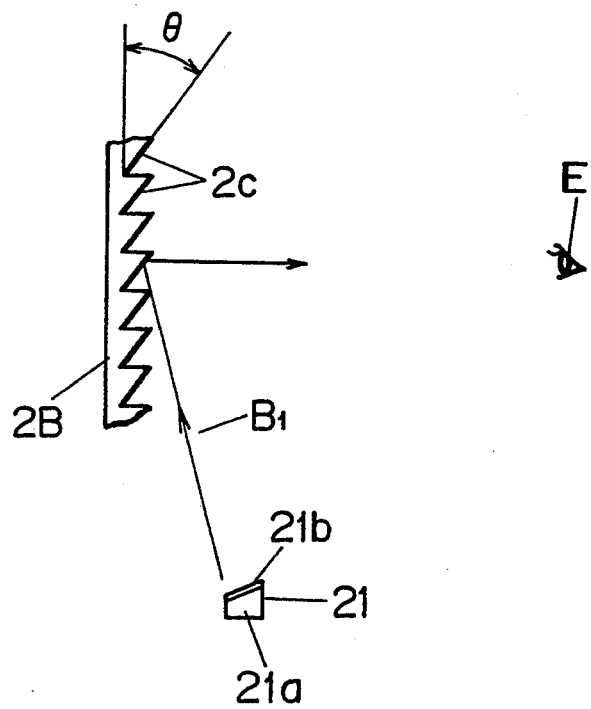
FIG. 5 is a drawing for explaining a reflecting condition of a beam.

FIG. 5 is a drawing for explaining the reflection of the beam.

In the figure, reference numeral 2c shows inclined faces.

Next, the operation of the indicating instrument different from that of the indicating instrument shown in FIGS. 1 to 3 will be explained.

As described in FIG. 5, the beam B1 from the light source is reflected by the reflecting plate 21b toward the dial 2B and is further reflected by the dial 2B toward the view point E.

As a result, in this embodiment also, selecting the proper angle $\theta$ of the inclined face 2c makes it possible to obtain the same effect as the previous embodiment.

In this embodiment also, the front surface of the dial 2B comprising at least both ends 2bs and 2be of the graduations 2b and a rotation shaft (4a) not shown may be formed as saw teeth as described above.

Figure 7:
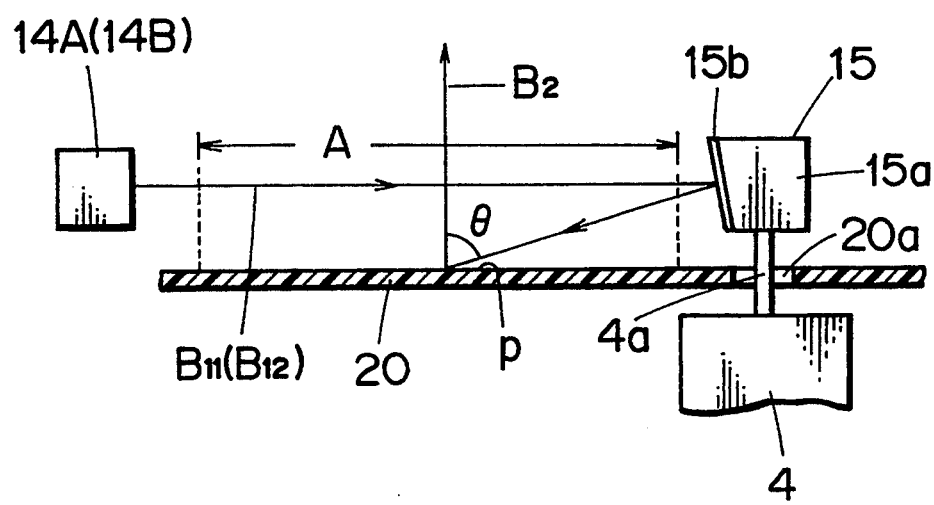
FIG. 7 is a drawing for explaining a dial according to a further embodiment of the present invention.

FIG. 7 is a drawing for explaining a structure of a dial according to further embodiment of the present invention. In the figure, like reference characters designate like or corresponding parts in FIGS. 9, 10, 12, 14, and 16, and the explanation thereof will be explained.

In FIG. 7, denoted 20 is a dial composed by a holographic optical element plate which has the structure that a holographic optical element is sandwiched by two glass plates. The incident angle is set as vertical to the dial (as substantially right angles) and a hole 20 is provided through which a rotation shaft of a mechanism 4 is inserted.

The reference symbol B2 is a diffracting beam emitted from the dial 20 and A a displaying range of the dial 20.

Figure 8:
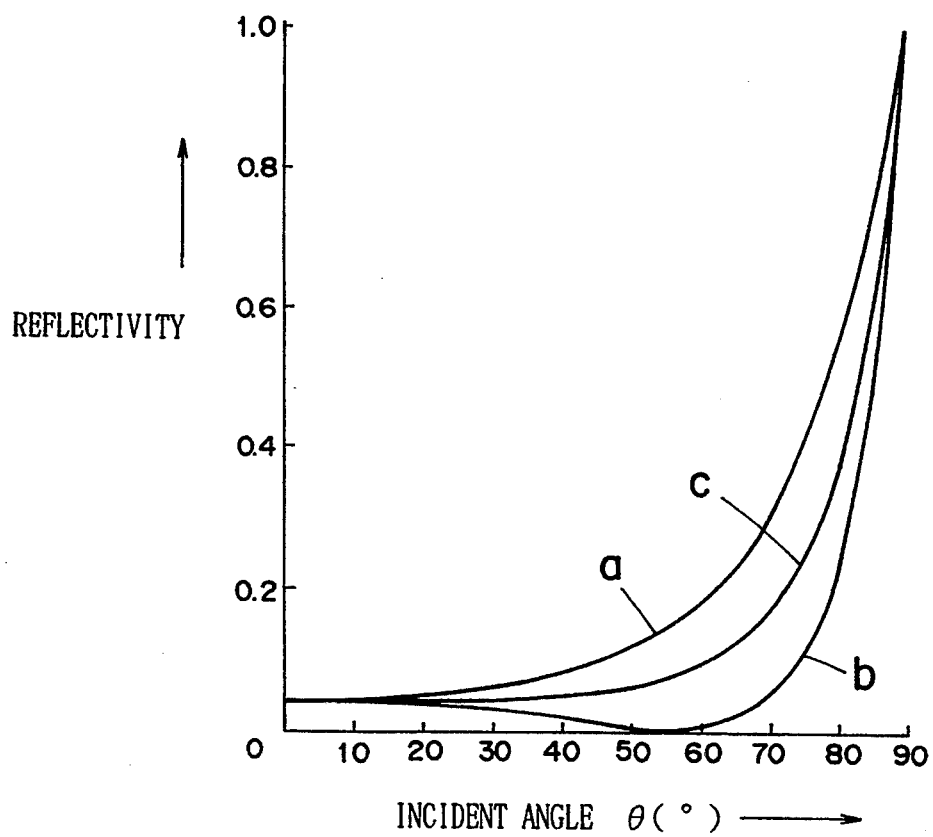
FIG. 8 is a drawing showing the relation between the incident angles and the reflectivity.

FIG. 8 is a drawing showing the relation between the incident angles and the reflectivity of the dial of FIG. 7.

In FIG. 8, the curve a shows a characteristic curve of a composition of the beam vibrating within the incident surface, the curve b a characteristic curve of a composition of the beam vibrating in the direction vertical to the incident surface, and the curve c a mean characteristic curve of characteristic curves a and b.

In the characteristic curves a to c, the refractive index of the glass composing the dial is 1.50.

Next, the operation of the indicating instrument different from that of the device according to the embodiment shown in FIGS. 6A, 6B, 9 to 14 will be explained.

As described above, when a divided beam B11 or B12 is introduced to the dial 20, the dial emits a diffracting beam B2 according to the divided beam B11 or B12 in the direction substantially vertical to the dial 20, so that the diffracting beam B2 from the dial 20 is directed to a view point E with the beam B3 being vertical to the dial 20.

As described above, in the embodiment, the diffracting beam is introduced to the view point E with the beam being vertical to the dial 20, permitting the optical pointer P to be recognized under the condition that the dial is directly observed and the recognizability of the optical pointer P can be improved under the condition that the dial 20 is directly observed.

In the embodiment shown in FIGS. 7 and 8, in order to effectively emit the diffracting beam B2, that is, to further improve the recognizability, the reflectivity should be decreased. Therefore, as clearly shown in FIG. 8, the incident angle $\theta$ is preferably set less than or equal to 60°.

Figure 9:
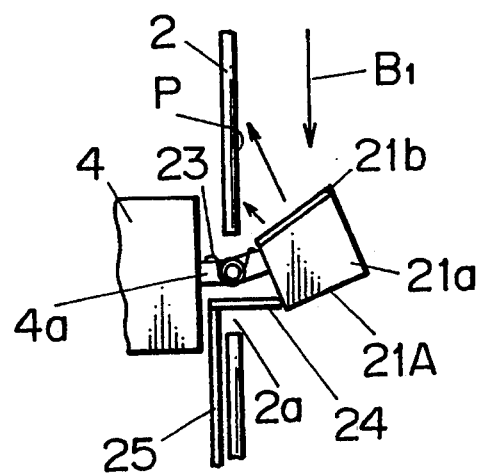
FIG. 9 is a schematic drawing showing a cross-sectional view of a primary portion of an indicating instrument according to a further embodiment of the present invention.
Figure 10:
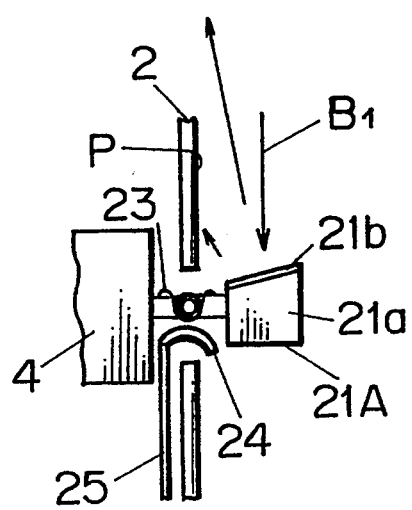
FIG. 10 is the drawing for explaining a state in which the pointer forming portion in FIG. 9 rotates to reach the position of a second reflecting position.
Figure 11A:
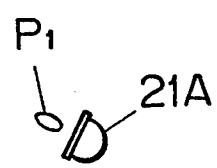
FIGS. 11A, 11B, and 11C are drawings showing the length of the optical pointers.
Figure 11B:
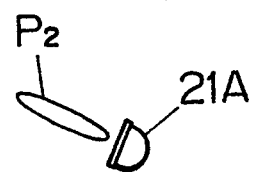
Figure 11C:
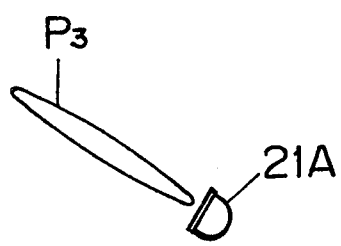

FIG. 9 is a schematic drawing showing a cross section of primary portion of an indicating instrument according to another embodiment of the present invention. FIG. 10 shows the state that the pointer forming portion in FIG. 9 rotates to reach the position of a second reflecting position. Further, FIGS. 11A, 11B, and 11C are drawings for explaining the length of the optical pointer. Like reference characters in the figures designate like or corresponding parts of FIGS. 1 to 5 and FIGS. 14 to 17, and the explanation thereof will be omitted.

In the figures, reference numeral 21A shows a pointer forming portion, which comprises a base 21a pivotally mounted to an end of a rotation shaft 4a of a mechanism 4 so as to move in the direction vertical to a dial 2 between first and second reflecting positions described below, and a reflecting plate 21b mounted to the base 21a for reflecting a beam B1 from a light source to the front face of the dial 2.

Denoted 23 is a torsion spring as a first urging member disposed between the rotation shaft 4a and the pointer forming portion 21A to urge the pointer forming portion 21A to a second reflecting position (the position shown in FIG. 10).

Numeral 24 is a bimetal operating as a second urging member with an end thereof being attached to a supporting plate 25 described below. When power is not applied, as shown in FIG. 9, the pointer forming portion 21A is urged to a first reflecting position. Then, when power is applied, as shown in FIG. 10, the pointer forming portion is moved to the second reflecting position from the first reflecting position by the urging force of the torsion spring.

Numeral 25 is a supporting plate mounted to an instrument case not shown and P1, P2, and P3 are optical pointers.

The first reflecting position of the pointer forming portion 21A is defined as a position where the beam B1 is reflected to a portion of the dial 2 adjacent to the pointer forming portion 21A as shown in FIGS. 9 and FIG. 11A. The second reflecting position of the pointer forming portion 21A is defined as a position where the beam B1 is reflected from the portion of the dial 2 adjacent to the pointer to a portion adjacent to the graduations as shown in FIGS. 10 and FIG. 11C.

The portion adjacent to the graduations means a portion where the pointer overlaps the graduations as shown in FIG. 2 or a portion adjacent to the graduations 2b on the pointer forming portion side.

Next, the operation of the indicating instrument different from that of the indicating instrument shown in FIGS. 1 to 5 will be explained.

At first, switching on a switch such as an ignition switch not shown applies power to each element including the bimetal 24.

When the power is applied to the bimetal as described above, its bimetal changes the shape from the state shown in FIG. 9 to the state in FIG. 10 due to heat generated by the power, causing the pointer forming portion 21A to rotate from the first reflecting position in FIG. 9 to the second reflecting position in FIG. 10 by the urging force of the torsion spring 23.

Therefore, a short optical pointer P1 at the first reflecting position in FIG. 11A changes the shape thereof to a long optical pointer P3 in FIG. 11C through the shape of the optical pointer P2 shown in FIG. 11B by the rotation of the pointer forming portion from the first reflecting position to the second reflecting position.

As described above, in this embodiment, the length of the optical pointers P1 to P3 can be changed, which provides a new type indicating instrument.

Although the bimetal is attached to the supporting plate 25 in the above embodiment, the bimetal may be attached to the dial 2.

Further, exchanging the dial 2 with the dial 2A in FIGS. 1 and 2 or the dial 2B in FIGS. 4 and 5 can also improve the recognizability of the optical pointers P1 to P3.

Other material like shape memory alloy may function the same as the bimetal 24, permitting such material to be used as the second urging member.

Figure 6A:
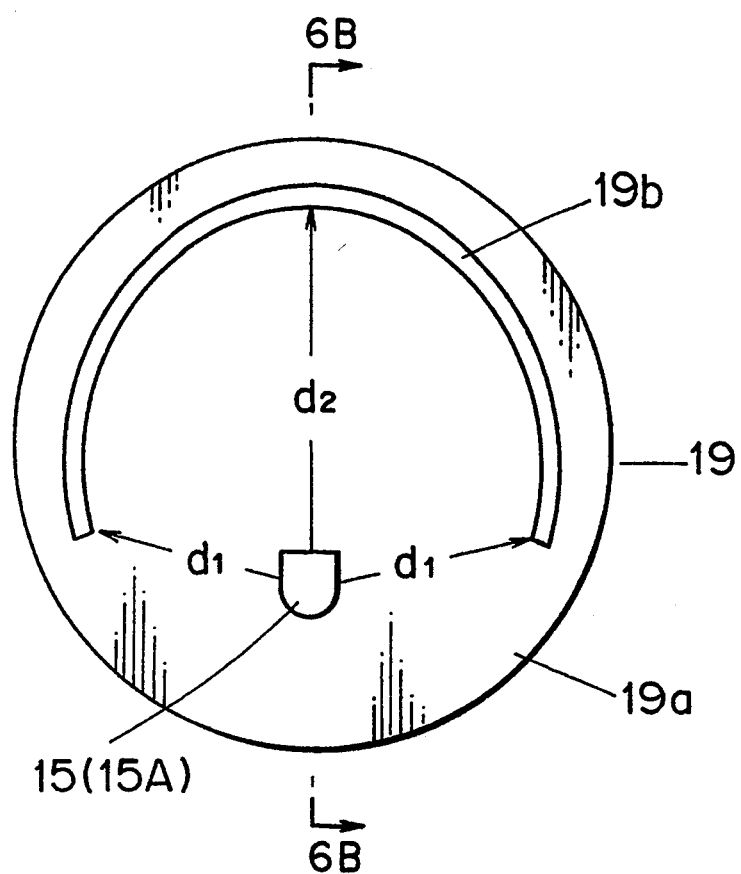
FIGS. 6A and 6B are a plan view and a cross-sectional view taken along the line X—X of the plan view showing the structure of the dial according to further embodiment of the present invention.
Figure 6B:
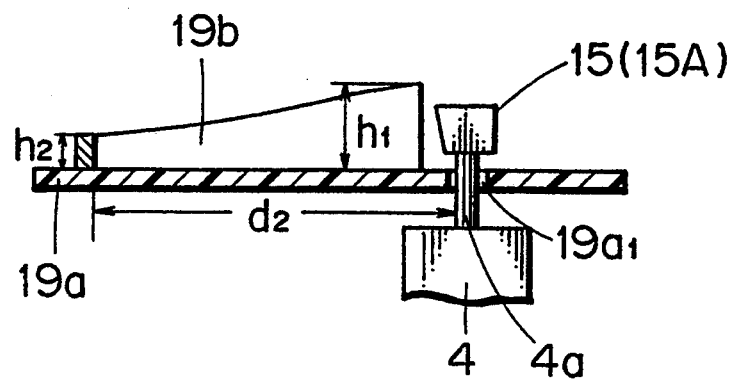

FIGS. 6A and 6B are a plan view and a cross-sectional view taken along the line X—X of the plan view showing the structure of the dial according to a further embodiment of the present invention. In the figures, like reference characters designate like or corresponding parts in FIGS. 9, 10, 12, 14, and 16.

In. FIGS. 6A and 6B, denoted 19 is a dial comprising a flat plate 19a and a wall plate 19b which is mounted on the flat plate 19a so as to cross at right angles with the plate 19a. The wall plate 19b forms a part of the ellipse. On the flat plate 19a is provided a hole 19a1 through which a rotation shaft of a mechanism 4 is inserted.

Reference symbols d1 and d2 show the length between the rotation shaft 4a and the inner surface of the wall plate 19b on the rotation shaft side 4a. The distance d1 is the shortest distance and d2 the longest distance.

Reference symbols h1 and h2 show the height of the wall plate. The height h1 corresponds to the portion of the distance d1 and h2 to the portion of the distance d2.

Further, graduations and the like are disposed inside or outside the wall plate 19b with respect to the rotation shaft 4a.

Next, the working of the indicating instrument different from that of the apparatus according to the embodiment in FIGS. 11 to 14.

As described above, since the length of the optical pointer formed under stable conditions has a predetermined length, as illustrated in FIGS. 6A and 6B, the distance between the rotation shaft 4a and the wall plate 19b and the height of the wall plate h1 and h2 are changed, and a part of the optical pointer is formed on the inner surface of the wall plate to change the length of the optical pointer, that is, the distance d1 and d2 in FIG. 6A.

As described above, in this embodiment, the length of the optical pointer can be changed by the wall plate, which provides a new type of instrument with a simple structure the same as the embodiment shown in FIGS. 9 and 11.

The height of the wall plate 19b need not necessarily be changed, permitting the wall plate 19b to have a uniform height.

Next, another embodiment of the present invention will be explained with reference to the drawings.

Figure 12:
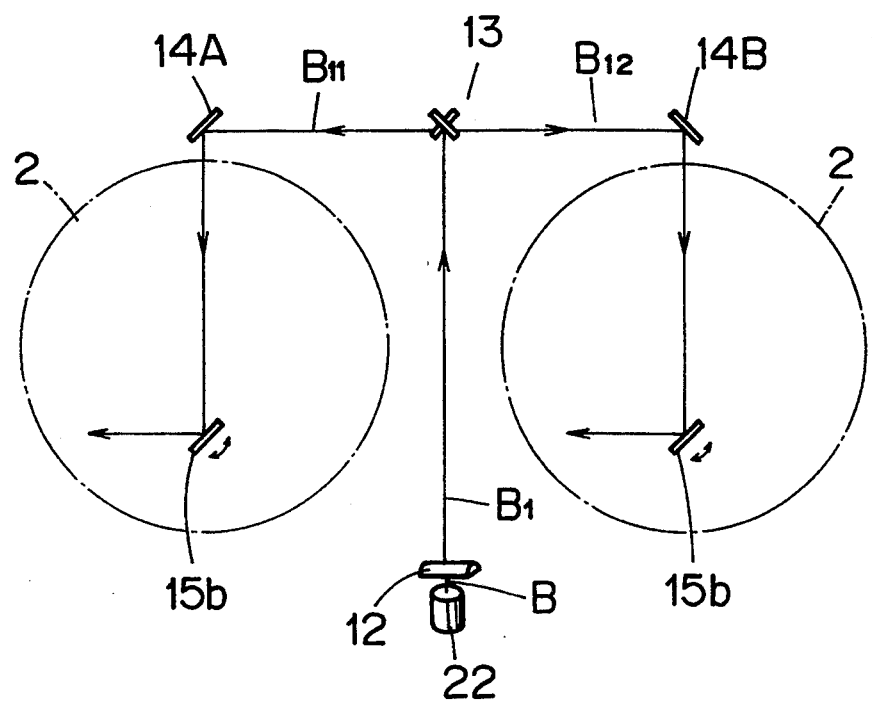
FIG. 12 is a schematic drawing showing a plan view of another indicating instrument system according to an embodiment of the present invention.
Figure 13A:
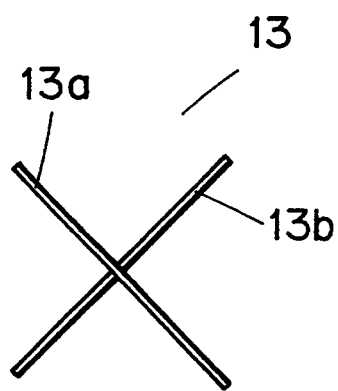
FIGS. 13A and 13B are an enlarged plan view and side view of a light dividing means.
Figure 13B:
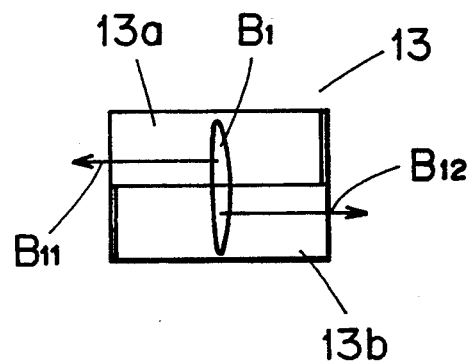

FIG. 12 is a schematic drawing showing a plan view of an indicating instrument system according to an embodiment of the present invention, and FIGS. 13A and 13B are an enlarged plan view and a side view of a light dividing means. In the figures, denoted 22 is a point light source emitting a beam B such as a laser having a round cross section, while 12 is a cylindrical lens as a means for changing the shape of the light. The cylindrical lens 12 converts the beam from the point light source 22 to a substantially linear beam B1 in the direction vertical to a generating line of the cylindrical lens.

Reference numeral 13 shows a reflecting portion 13 as light dividing means, which comprises a first reflecting plate and a second reflecting plate which cross at right angles with each other. As shown in FIG. 13B, the reflecting portion 13 divides the beam B1 from the cylindrical lens 13 into divided beams B11 and B12 in two directions different from each other.

Further, reference numerals 14A and 14B are a third reflecting plate and a fourth reflecting plate respectively as reflecting members, which reflect the beams B11 and B12 introduced from the first reflecting plate 13a and the second reflecting plate 13b to a reflecting plate 15b of a pointer forming portion 15 described below.

Next, the operation of the indicating instrument will be explained.

At first, when the point light source 22 emits beam B having a round cross section by the control of a driving circuit not shown, the beam B is converted into a linear beam B1 as shown in FIG. 13B by the cylindrical lens 12. Then, the beam B1 is divided into divided beams B11 and B12 into two different directions by the first reflecting plate 13a and 13b.

Figure 14:
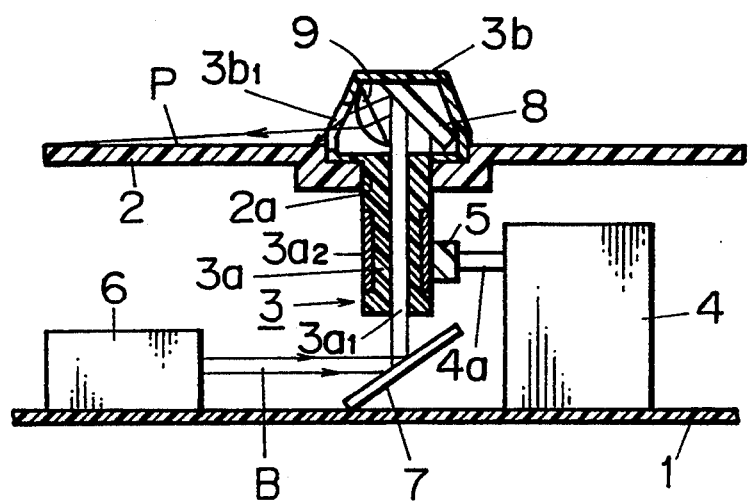
FIG. 14 is a schematic drawing showing a cross-sectional view of a conventional indicating instrument.
Figure 15:
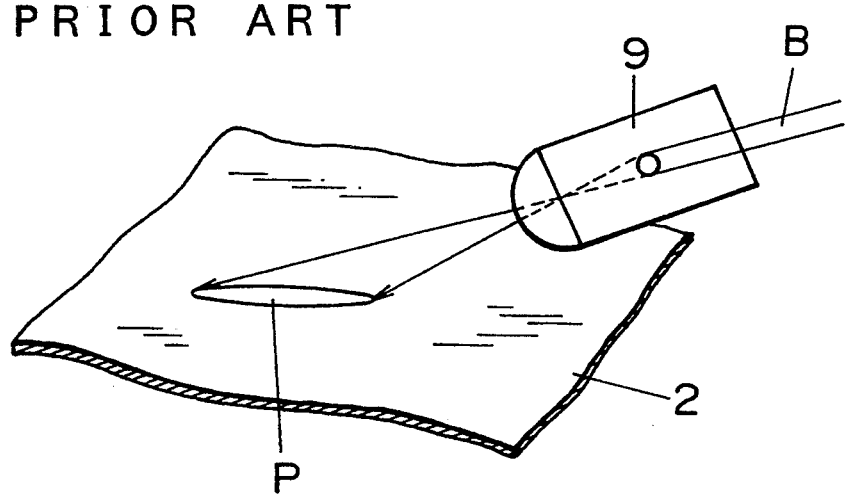
FIG. 15 is a drawing showing principle of the conversion from the beam having a round cross section to the linear beam in the conventional instrument.
Figure 16:
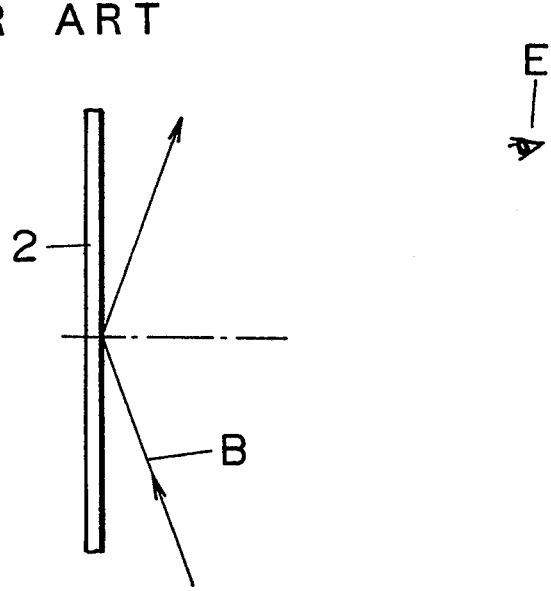
FIG. 16 is a drawing for explaining the reflecting condition of a beam in the conventional embodiment.
Figure 17:
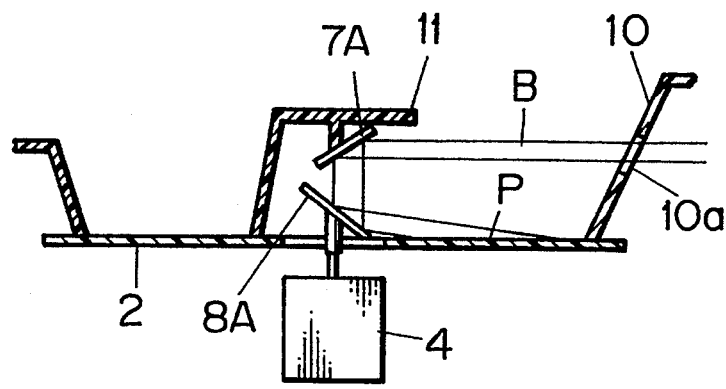
FIG. 17 is a schematic drawing showing a cross-sectional view of another conventional indicating instrument.

Then, the divided beams B11 and B12 are reflected by the third reflecting plate 14A and the fourth reflecting plate 14B respectively to the reflecting plate 15b of the pointer forming portion and are further reflected to the front surface of the dial 2 since the reflecting plate 15b is inclined as illustrated in FIG. 14.

As described above, the divided beams B11 and B12 are reflected by the reflecting plate 15b to the dial 2 to form an optical pointer P.

The pointer forming portion 15 is rotated by the mechanism 4 while the optical pointer is being formed, as described above, so that the graduation 2b corresponding to a portion pointed at by the optical pointer P provides information on the driving condition.

Therefore, the graduation on the dial 2A which is pointed at by the optical pointer P is read to obtain information on the driving condition.

As described above, in this embodiment, the beam B from a point light source 22 is divided into a plurality of beams so as to be introduced to a plurality of pointer forming portions 15 as the beams B11 and B12. As a result, a reduced number of light sources decreases the production cost of the system and overall power consumption.

Meanwhile, as the pointer forming portion 15 rotates, as shown in FIG. 12, the third and fourth reflecting plates 14A and 14B are preferably disposed in front of the central portion of the graduations of the dial 2. This is also applied to a preferred embodiments described below.

Meanwhile, in the above embodiment, although the beam dividing means is composed of the first and second reflecting plates 13a and 13b, a beam splitter utilizing half mirrors and prisms may be used. However, reflecting plates are preferably used in consideration of the reflection efficiency.

Further, in the above embodiment, although the beam B is divided into two beams B11 and B12, the beam B1 may be divided into three or more beams by similar beam dividing means.

As described above, the device according to the present invention has the dial with the front surface thereof being formed as a sphere or as saw teeth defining concentric circles, and the light source is disposed out of the graduations and in front of the dial, permitting light from the pointer forming portion to be effectively reflected on the front surface of the dial toward the view point. As a result, the recognizability of the pointer can be improved in spite of a low power consumption.

Further, in the indicating instrument according to another embodiment of the present invention, the dial is made of a holographic optical element plate which reflects a diffracting beam in the direction substantially vertical, permitting the dial to emit the diffracting beam according to the divided beam in the direction substantially vertical to the dial. As a result, the recognizability of the dial when directly observed can be improved.

Further, the indicating instrument according to the present invention has a structure in which the length of the pointer formed by light can be changed by the urging force of the first and second urging members. This structure constitutes a new type of indicating instrument.

Further, the indicating instrument according to the present invention has a structure in which the length of the pointer formed by light can be changed by the urging force of the first and second urging members, while the front surface of the dial is formed as a sphere or as saw teeth defining concentric circles. This structure also embodies a new type of indicating instrument in which the recognizability of the pointer is improved in spite of a low power consumption.

As described above, the indicating instrument system according to the present invention comprising: a beam shape converting means for converting a beam from one light source into a linear beam; beam dividing means for dividing the linear beam from the beam shape converting means into a plurality of divided beams; and a plurality of reflecting members for reflecting the plurality of divided beams which are divided by the beam dividing means to a plurality of pointer forming portions for further reflecting the plurality of divided beams each toward a dial as a pointer indicating graduations on the dial. Therefore, since the beam emitted from one light source is divided into a plurality of beams to be introduced into a plurality of pointer forming portions, the number of light sources are reduced, which decreases production cost and power consumption of the system.

What is claimed is:

1. An indicating instrument comprising:
a dial having graduations;
a light source disposed in front of and out of said graduations; and
a pointer forming portion attached to a shaft which is rotated by a mechanism, said pointer forming portion having an inclined surface relative to said shaft for reflecting a beam from said light source to said dial to form a pointer image on a front surface of said dial, wherein
said front surface of said dial having said graduations is concavedly curved such that an outer periphery of said front surface of said dial curves outwardly relative to said pointer forming portion, whereby said inclined surface and said concavedly curved front surface form the pointer image.

2. An indicating instrument, comprising:
a dial having graduations;
a light source;
a cylindrical lens positioned with said light source and relative to the graduations for converting a beam from the light source to a substantially linear beam;
a pointer forming portion having a reflector which includes an inclined surface relative to said shaft for reflecting the substantially linear beam from said cylindrical lens to said dial to form a pointer image on a front surface of said dial; and
a mechanism for rotating said pointer forming portion through a shaft, wherein
said front surface of said dial having said graduations is formed so as to reflect light from the substantially linear beam in a direction substantially vertical to said dial, whereby said inclined surface of the reflector of said pointer forming portion and said front surface of said dial form the pointer image.

3. An indicating instrument as claimed in claim 2, wherein said pointer forming portion moves in the direction vertical to said dial between a first reflecting position, where said beams is reflected to a portion of said dial adjacent to said pointer forming portion, and a second reflecting position, where said beam is reflected to a portion from a portion of said dial adjacent to said pointer forming portion to a portion adjacent to said graduations, and a first urging member is provided to urge said pointer forming portion from said first reflecting position to said second reflecting position, and a second urging member is provided to urge said pointer forming portion to said first reflecting position, and said pointer forming portion is urged from said first reflecting position to said second reflecting position by urging force of said first urging member when power is applied.

4. An indicating instrument as claimed in claim 2 or 3, wherein an outer curvature of the front surface of said dial is concavedly curved so as to stick out forwardly relative to the shaft.

5. An indicating instrument as claimed in claim 2 or 3, wherein the front surface of said dial is further formed as sawteeth in cross-section such that an outer curvature of the front surface sticks out forwardly relative to the shaft, and the sawteeth describe concentric circles on the front surface of said dial about the shaft.

6. An indicating instrument as claimed in claim 2 or 3, wherein the front surface of said dial is further formed as a holographic optical plate for reflecting diffracting beams in the direction substantially vertical to said dial.

* * * * *